(12) United States Patent
Yui et al.

(10) Patent No.: US 9,635,296 B2
(45) Date of Patent: Apr. 25, 2017

(54) SOLID-STATE IMAGING DEVICE

(71) Applicant: Sharp Kabushiki Kaisha, Osaka-shi, Osaka (JP)

(72) Inventors: Tatsuya Yui, Osaka (JP); Kohzoh Hoshino, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 270 days.

(21) Appl. No.: 14/428,386

(22) PCT Filed: Oct. 21, 2013

(86) PCT No.: PCT/JP2013/078417
§ 371 (c)(1),
(2) Date: Mar. 16, 2015

(87) PCT Pub. No.: WO2014/065223
PCT Pub. Date: May 1, 2014

(65) Prior Publication Data
US 2015/0249797 A1    Sep. 3, 2015

(30) Foreign Application Priority Data

Oct. 25, 2012 (JP) .................. 2012-235934

(51) Int. Cl.
*H04N 5/378* (2011.01)
*H04N 5/3745* (2011.01)
*H04N 5/357* (2011.01)

(52) U.S. Cl.
CPC .......... *H04N 5/378* (2013.01); *H04N 5/3575* (2013.01); *H04N 5/37457* (2013.01)

(58) Field of Classification Search
CPC .. H04N 5/378; H04N 5/3575; H04N 5/37457; H04N 5/374; H04N 5/359;
(Continued)

(56) References Cited

U.S. PATENT DOCUMENTS 7,667,181 B2 *  2/2010  Simony ............... H04N 5/3598
                                                250/214 R
7,702,179 B2 *  4/2010  Ting .................... H04N 5/3598
                                                348/251
(Continued)

FOREIGN PATENT DOCUMENTS

JP    2007-036916 A    2/2007
JP    2007-104240 A    4/2007
(Continued)

OTHER PUBLICATIONS

Official Communication issued in International Patent Application No. PCT/JP2013/078417, mailed on Dec. 17, 2013.

*Primary Examiner* — John Lee
(74) *Attorney, Agent, or Firm* — Keating & Bennett, LLP

(57) ABSTRACT

There is provided a solid-state imaging device capable of correcting a blackening phenomenon caused by intense light, with a small-scale circuit configuration. An AD converter 130 that performs sampling of an output voltage VS on a column signal line 111 includes a comparator 131 that compares the output voltage VS with a ramp-wave reference voltage during a sampling period; a judging circuit 132 that accepts as input an output from the comparator 131 and judges a voltage level of the output voltage VS; and a memory portion 133 that stores, as a digital value, a count value corresponding to the output voltage VS, based on an output from the judging circuit 132. The comparator 131 amplifies a voltage change of the output voltage VS obtained after a lapse of a reset period in which a voltage of a FD portion 103 in a pixel circuit 100 is reset, and the judging circuit 132 judges, based on the voltage change, whether light received by the pixel circuit 100 is intense light, during (Continued)

a predetermined detection period between the reset period and a period in which an output voltage Vrst obtained after the reset is sampled.

11 Claims, 13 Drawing Sheets

(58) Field of Classification Search
CPC .. H04N 5/3745; H04N 5/3598; H04N 5/2175; H04N 3/1568
See application file for complete search history.

(56) References Cited

U.S. PATENT DOCUMENTS

| | | | | |
|---|---|---|---|---|
| 7,880,779 B2* | 2/2011 | Storm | ............... | H04N 5/3598 348/241 |
| 8,031,241 B2* | 10/2011 | Maeda | ............... | H04N 5/351 348/241 |
| 8,325,255 B2* | 12/2012 | Aruga | ............... | H04N 5/3598 348/294 |
| 8,421,893 B2* | 4/2013 | Kurihara | ............... | H04N 5/3598 348/241 |
| 8,687,098 B2* | 4/2014 | Aruga | ............... | H04N 5/3598 348/294 |
| 8,773,191 B2* | 7/2014 | Park | ............... | H03K 5/08 327/309 |
| 9,451,193 B2* | 9/2016 | Yamagata | ............... | H04N 5/378 |
| 2007/0023788 A1 | 2/2007 | Yasui et al. | | |
| 2007/0080376 A1 | 4/2007 | Adachi et al. | | |
| 2008/0237448 A1* | 10/2008 | Simony | ............... | H04N 5/3598 250/208.1 |
| 2009/0009635 A1* | 1/2009 | Maeda | ............... | H04N 5/351 348/241 |
| 2011/0013050 A1 | 1/2011 | Aruga et al. | | |
| 2012/0008032 A1 | 1/2012 | Kurihara et al. | | |
| 2015/0249797 A1* | 9/2015 | Yui | ............... | H04N 5/3575 250/208.1 |

FOREIGN PATENT DOCUMENTS

| | | |
|---|---|---|
| JP | 2011-023900 A | 2/2011 |
| JP | 2011-176762 A | 9/2011 |
| JP | 2012-010055 A | 1/2012 |

* cited by examiner

SOLID-STATE IMAGING DEVICE

CROSS-REFERENCE TO RELATED APPLICATIONS

This application is a National Phase filing under 35 U.S.C. §371 of International Application No. PCT/JP2013/078417 filed on Oct. 21, 2013, and which claims priority to Japanese Patent Application No. 2012-235934 filed on Oct. 25, 2012.

TECHNICAL FIELD

The present invention relates to a solid-state imaging device represented by a CMOS image sensor and a drive method thereof.

BACKGROUND ART

In resent years, as an image sensor device, relative to a conventional CCD image sensor, a CMOS image sensor has been widespread, ranging from one for mobile phones to digital cameras, because of its advantages of low voltage and low power consumption and the easiness of merging with peripheral circuits.

FIG. 12 is a diagram illustrating a structure of a conventional CMOS image sensor 4. A general structure of the conventional CMOS image sensor is such that pixel circuits 100 are arranged in rows and columns, and a common power line 113 to which a pixel common voltage VD is supplied, a row scanning circuit 110, and column signal lines 111 are connected to each pixel circuit 100. Control and drive of the pixel circuits 100 are performed by the row scanning circuit 110 on a row-by-row basis. Each column signal line 111 is connected to a constant current source 120 and an AD converter 130 that performs AD conversion. After a voltage on the column signal line 111 is compared by a comparator 131 in the AD converter 130 with a ramp wave generated by a ramp wave generator 140, a memory portion 133 converts a result of the comparison into a digital code using a counter circuit 135 and records the digital code corresponding to the amount of light.

FIG. 2 shows an example of a configuration of a pixel circuit 100. The pixel circuit 100 includes a photodiode (PD) portion 101 that performs photoelectric conversion; a transfer gate transistor 102; a floating diffusion (FD) portion 103 that temporarily holds, through the transfer gate transistor 102, charge generated corresponding to light; a transistor 104 composing a source follower circuit that outputs a voltage of the FD portion 103 as a voltage to a column signal line 111; and a reset transistor 105 that resets the FD portion 103 to a certain voltage. A drain terminal of the transistor 104 composing a source follower circuit is connected to a common power line 113, by which a pixel common voltage VD is supplied.

For a method of reading the amount of charge, a correlated double sampling (CDS) scheme is commonly used. In the CDS scheme, a voltage (reset level) on the column signal line 111 in which a voltage of the FD portion 103 obtained before transferring charge is reflected is read, and a voltage is applied to the transfer gate transistor 102 to transfer charge, and then, a voltage (signal level) on the column signal line 111 in which a voltage of the FD portion 103 having decreased due to the transfer of the charge is reflected is read, by which the differential voltage between the reset level and the signal level is calculated as a digital code that reflects the amount of light.

Meanwhile, there is known a blackening phenomenon where, when, for example, intense light, e.g., the sun, is captured by a CMOS image sensor, despite the fact that an image is such that the sun portion is supposed to output the full code, a blackened image is displayed. A detail of the reason therefor is described below.

FIG. 13 is a timing chart showing the operations performed by control lines (an RST wiring line, a VR wiring line, and a TX wiring line) for a row from which charge is read, and changes in a voltage VS on a column signal line 111 for when a pixel circuit 100 receives normal light and when the pixel circuit 100 receives intense light.

After the FD portion 103 is reset during a period T1, a reset level voltage Vrst is sampled in the latter part of a period T2. When charge is transferred from the PD portion 101 to the FD portion 103 during a period T3, a signal level Vsig is sampled during a period T4. Then, a voltage Vele=Vrst−Vsig corresponding to the amount of light is converted into a digital code value.

However, it is known that, as indicated by a dashed line in FIG. 13, when the PD portion 101 receives intense light, the voltage VS on the column signal line 111 decreases from the time of reset level sampling which is before transferring charge. In this case, since Vele becomes substantially 0, it is erroneously judged that it is black (=a dark state).

To avoid this blackening phenomenon, various methods have been proposed so far.

Patent Document 1 discloses a digital CDS method. Digital CDS is a method in which first a reset level voltage is AD-converted and then a signal level voltage is AD-converted, by which the difference between the reset level and signal level digital values is calculated as a digital code proportional to the amount of light.

As measures to avoid a blackening phenomenon in the digital CDS, in Patent Document 1 an intense light judgment is made during a reset level sampling period. When intense light enters, a reset level voltage to be sampled during the reset level sampling period decreases. The method is such that, when the voltage goes out of a ramp-wave reference voltage range which is assumed to perform AD conversion, the light is judged to be intense light and a result thereof is reflected in a digital code.

In addition, Patent Document 2 proposes a method of controlling a digital code by temporarily saving a reset level voltage in a sampling capacitance and comparing the reset level voltage with a reference voltage by a latch circuit to make a judgment of normal light and intense light by whether the reset level voltage is higher or lower than the reference voltage.

Patent Document 3 proposes a method in which after a sampling period for a reset level voltage and a signal level voltage ends, the signal level voltage is compared with a blackening judgment voltage generated by a correction bias circuit.

PRIOR ART DOCUMENTS

Patent Documents

Patent Document 1: Japanese Patent Application Publication NO. 2011-23900
Patent Document 2: Japanese Patent Application Publication NO. 2012-10055
Patent Document 3: Japanese Patent Application Publication NO. 2011-176762

SUMMARY OF THE INVENTION

Problems to be Solved by the Invention

However, the above-described methods have the following problems.

In the method of Patent Document 1, since a comparison with a reference signal is performed during the reset level sampling period, an auto-zero period in which a signal line voltage is sampled to adjust to a reference with a reference signal voltage is present just before a reset level measurement period. When intense light to enter is strong, if the signal line voltage becomes lower than that for a normal time during the auto-zero period, too, the auto-zero reference between the signal line voltage and the reference signal voltage shifts to the low voltage side. Accordingly, there is a possibility that despite the fact that the light is intense light, the voltage may fall within a reference signal's AD conversion range at the time of subsequent reset level sampling and thus it may be erroneously judged that it is normal.

To prevent this, a circuit technique is employed in which in order that the signal line voltage does not become lower than or equal to a specified voltage during the auto-zero period, dummy pixel transistors are provided for each column signal line, by which the signal line voltage is clamped for a certain period of time including the auto-zero period. A clamp voltage can be changed in accordance with the analog gain setting or the setting of the number of quantization bits.

However, since the signal line voltage is clamped during the auto-zero period for AD conversion, an influence on the AD conversion of the reset level becomes large. For example, when the clamp voltage is set to be too low, the blackening phenomenon may not be able to be completely eliminated, and when the clamp voltage is set to be too high, though the blackening phenomenon can be completely eliminated, the dark image characteristics may be degraded.

In addition, when the analog gain setting is changed to high gain, the reference signal's AD conversion range at the time of reset level sampling is narrowed, and thus, the clamp voltage needs to be precisely set for each analog gain.

Hence, in Patent Document 1, the configuration is such that a correction bias circuit is provided so that a clamp voltage that clamps a column signal line can be changed depending on a slope of a reference voltage which is a ramp wave set based on slope determining information including the number of quantization bits, a set value for the analog gain, and the operating frequency of a counter circuit. However, the layout area is consumed by an amount corresponding to the correction bias circuit.

In the method of Patent Document 2, a signal line voltage at the time of reset level sampling is sampled separately from that used for AD conversion and is temporarily saved in a capacitor. Thus, a problem such as that in Patent Document 1 does not occur. However, to allow the latch circuit to operate to substitute a digital code value, there are required a capacitor for holding a reset level voltage and a capacitor for holding a reference voltage for a comparison with the reset level voltage. A layout area allocated to these capacitors is required for each column, increasing the layout areas.

In the technique of Patent Document 3, a comparison between a voltage obtained at the time of signal level sampling and a bias voltage generated by a bias voltage generating transistor arranged for each column is performed after the completion of the signal level sampling, to make a judgment of normal light and intense light. However, capacitors for holding signal level voltages are required for each column, increasing layout areas.

In addition, since a judgment of intense light is made based on a signal level voltage, variations in reset level voltage caused by variations in the characteristics of pixel circuits cannot be handled. Accordingly, intense light may be erroneously judged to be normal light in a pixel with a high reset level voltage, and normal light may be erroneously judged to be intense light in a pixel with a low reset voltage level.

The present invention is made in view of the above-described problems, and an object of the present invention is to provide a solid-state imaging device capable of correcting a blackening phenomenon caused by intense light, while suppressing an increase in layout areas due to intense light detection circuits which are provided for each column to correct the blackening phenomenon, and without degrading the dark image characteristics.

Means for Solving the Problem

A solid-state imaging device according to the present invention for attaining the above-described object is a solid-state imaging device that has a plurality of pixel circuits arranged in a matrix form in column and row directions and reads amounts of accumulated charge using a correlated double sampling method, the plurality of pixel circuits converting the amounts of the accumulated charge into voltages by photoelectric conversion, and outputting the converted voltages to column signal lines. The solid-state imaging device has a first feature that the solid-state imaging device comprises AD converters that convert the output voltages outputted to the column signal lines into digital values, each of the AD converters includes:
- a comparator that compares a corresponding one of the output voltages with a ramp-wave reference voltage during a sampling period in which the output voltages are sampled;
- a judging circuit that accepts as input an output from the comparator and judges a voltage level of the output voltage; and
- a memory portion that stores, as the digital value, a count value corresponding to the output voltage, based on an output from the judging circuit, the comparator amplifies a voltage change of the output voltage obtained after a lapse of a reset period in which a voltage of a floating diffusion portion in a corresponding one of the pixel circuits is reset, and the judging circuit judges, based on the voltage change, whether light received by the pixel circuit is intense light, during a predetermined detection period between the reset period and a reset level sampling period in which the output voltage obtained after the reset is sampled.

The solid-state imaging device according to the present invention having the above-described first feature can be further configured such that when the judging circuit judges that the light is the intense light, a digital code value corresponding to an amount of the light received by the pixel circuit is set to a predetermined default value regardless of an actual voltage value of the output voltage obtained after the reset, and is stored in the memory portion.

The solid-state imaging device according to the present invention having the above-described first feature further has a second feature that when a slope of the voltage change is greater than or equal to a reference value, the judging circuit judges that the light received by the pixel circuit is normal light, and when the slope of the voltage change is smaller than the reference value, the judging circuit judges that the light received by the pixel circuit is intense light, and a result of the judgment is recorded in the memory portion.

Here, it is preferred that the reference value is zero or a negative value.

It is further preferred that in the solid-state imaging device according to the present invention having the above-described first or second feature, the judging circuit have two input terminals that accept as input the amplified output signal from the comparator and one of positive and negative pulse signals, and judge whether the light is the intense light, by accepting as input the pulse signal during the detection period, and record a result of the judgment in the memory portion.

It is further preferred that in the solid-state imaging device according to the present invention having the above-described first or second feature, during the detection period, the count value is always set to one of a maximum value and a minimum value represented by the same number of bits as the digital value.

The solid-state imaging device according to the present invention having the above-described first or second feature further has a third feature that the solid-state imaging device comprises a circuit that fixes the output voltage at a predetermined clamp voltage during the reset period.

It is further preferred that in the solid-state imaging device according to the present invention having the above-described third feature, the clamp voltage is a lower voltage than the reset level at which the output voltage obtained after the reset is sampled, when the pixel circuit receives normal light.

It is further preferred that in the solid-state imaging device according to the present invention having the above-described second or third feature, when light where the slope of the voltage change has the reference value is received, a voltage difference between the reset level at which the output voltage obtained after the reset is sampled and a signal level at which the output voltage obtained after transferring the accumulated charge to the floating diffusion portion is sampled is larger than a full-scale voltage of the AD converter.

The solid-state imaging device according to the present invention having the above-described third feature can be further configured such that each of the column signal lines is connected to a same reference voltage through a corresponding one of switches provided for each column signal line, and the output voltage obtained during the reset period is fixed at the clamp voltage by turning on a corresponding one of the switches during the reset period.

The solid-state imaging device according to the present invention having the above-described third feature further comprises a bias voltage generating circuit that generates and supplies a same control voltage to each of the column signal lines, and the clamp voltage supplied to the column signal line is adjustable by the control voltage.

Effect of the Invention

According to the present invention, a voltage change of an output voltage on a column signal line obtained after resetting a voltage of a floating diffusion portion in a pixel circuit is amplified using a comparator which is used for AD conversion, and a judging circuit detects a sudden change in the output voltage occurring when intense light is received, during a period between a reset period and a reset level sampling period in which the output voltage obtained after the reset is sampled. By this, a solid-state imaging device can be implemented that is capable of correcting a blackening phenomenon caused by intense light, with a small-scale circuit configuration and a short judgment period.

DESCRIPTION OF EMBODIMENT

First Embodiment

Figure 1:
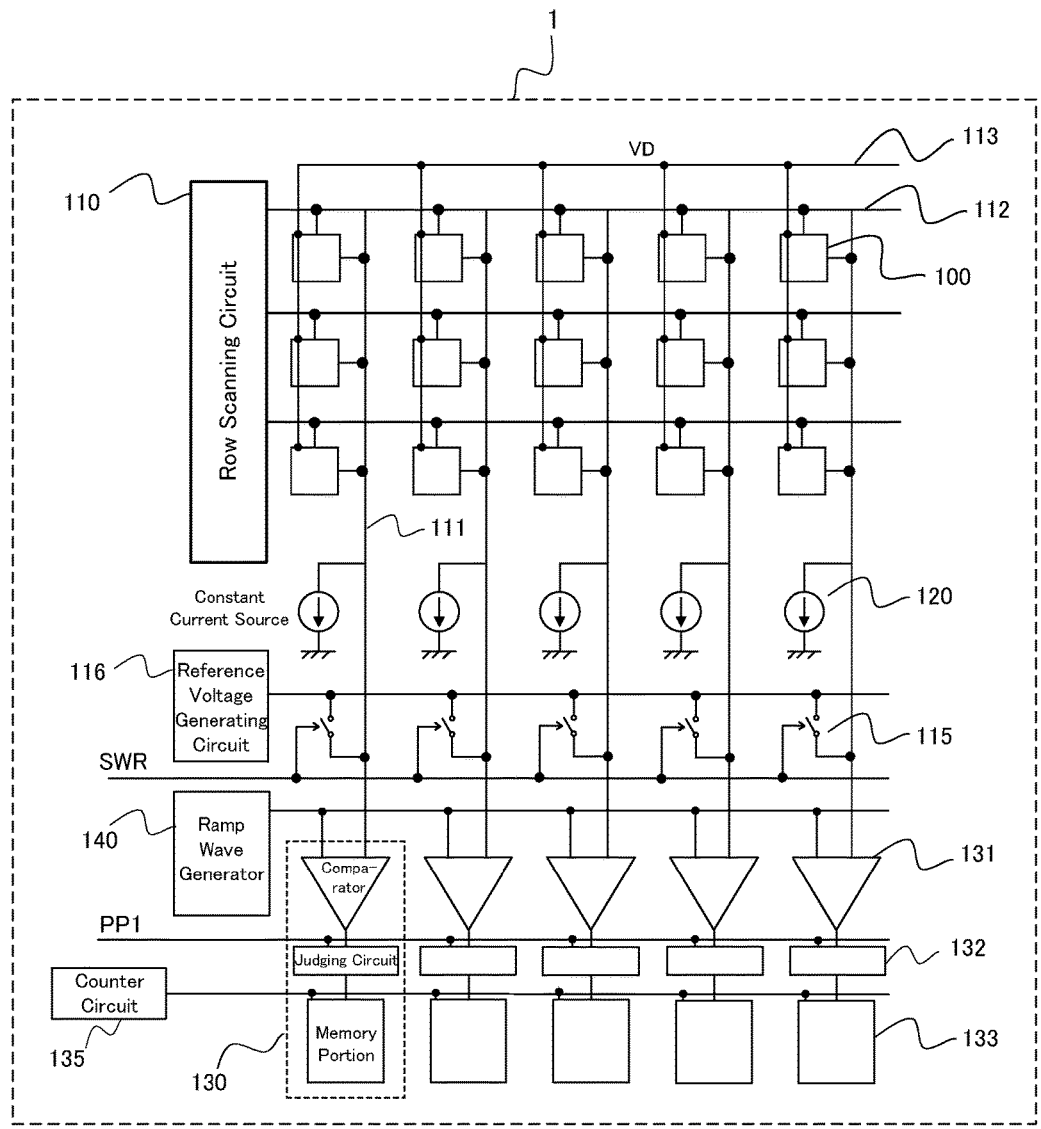
FIG. 1 is a circuit configuration diagram showing an example of a solid-state imaging device according to one embodiment of the present invention.

In the following, a solid-state imaging device according to one embodiment of the present invention (hereinafter, referred to as the "device 1 of the present invention", as appropriate) will be described with reference to the drawings. FIG. 1 shows an example of a circuit configuration of the device 1 of the present invention.

The device 1 of the present invention is a CMOS image sensor and has, as shown in FIG. 1, a plurality of pixel circuits 100 arranged in a matrix form in column and row directions. Each pixel circuit 100 is connected to a column signal line 111, a row signal line 112, and a common power line 113. Pixel circuits 100 belonging to the same column are connected to a common column signal line 111. On the other hand, pixel circuits 100 belonging to the same row are connected to a common row signal line 112 and connected to a row scanning circuit 110 through the row signal line 112. Note that each row signal line 112 includes three wiring lines, i.e., an RST wiring line 112a, a TX wiring line 112b, and a VR wiring line 112c, and each of the three wiring lines is connected to the row scanning circuit 110, but the three wiring lines are represented by a single row signal line 112 in FIG. 1.

The column signal lines 111 are respectively connected to constant current sources 120 provided for each column, and comparators 131 in AD converters 130 provided for each column likewise. In addition, the column signal lines 111 are connected to a common reference voltage generating circuit 116 through switches 115 provided for each column. Each switch 115 is controlled by a common voltage supply control line SWR.

The common power line 113 supplies a common voltage VD to all of the pixel circuits 100.

Each AD converter 130 includes a comparator 131, a judging circuit 132, and a memory portion 133. In the AD converter 130, one of two input terminals of the comparator 131 is connected to a ramp wave generator 140 and the other is connected to a corresponding column signal line 111. An output from the comparator 131 is inputted to the judging circuit 132. The judging circuit 132 accepts as input the output from the comparator 131 and an output from an intense light judgment signal line PP1 which is a common signal line for the columns, and judges whether light received by a pixel circuit 100 is intense light, and outputs a result of the judgment to the memory portion 133. A counter circuit 135 is connected to the memory portion 133.

Figure 2:
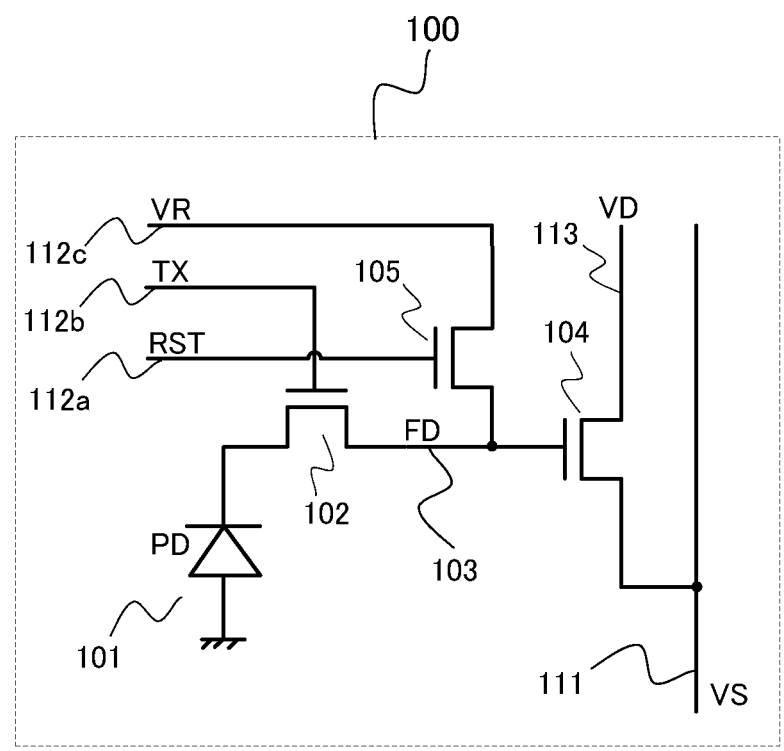
FIG. 2 is a circuit diagram showing a general configuration example of a pixel circuit.

FIG. 2 is a circuit diagram showing a configuration example of a pixel circuit 100. The pixel circuit 100 includes a photodiode (PD) portion 101 that performs photoelectric conversion, a transfer gate transistor 102, a floating diffusion (FD) portion 103, a source follower transistor 104 that composes a source follower circuit, and a reset transistor 105 that resets the FD portion 103 to a specified voltage.

The transfer gate transistor 102 is connected at its control terminal to a TX wiring line 112b and connected at its drain terminal to the FD portion 103 and connected at its source terminal to a cathode side of a photodiode composing the PD portion 101, and controls the transfer of charge generated in accordance with light received by the PD portion 101 to the FD portion 103, based on a signal from the TX wiring line 112b.

The source follower transistor 104 is connected at its drain terminal to the common power line 113 to which a pixel common voltage VD is supplied, and outputs a voltage VS at its source terminal to a column signal line 111, in accordance with a voltage of the FD portion 103 which is inputted to a control terminal of the source follower transistor 104.

The reset transistor 105 is connected at its control terminal to an RST wiring line 112a and connected at its drain terminal to a VR wiring line 112c and connected at its source terminal to the FD portion 103. By an input of a high-level control signal through the RST wiring line 112a, the voltage of the FD portion 103 is reset to the potential of the VR wiring line 112c. Note that the above-described pixel circuit 100 shows a configuration example for the case of not including a select transistor between the source follower transistor 104 and the column signal line 111, and needless to say, the configuration is not limited to the above-described one.

Figure 3:
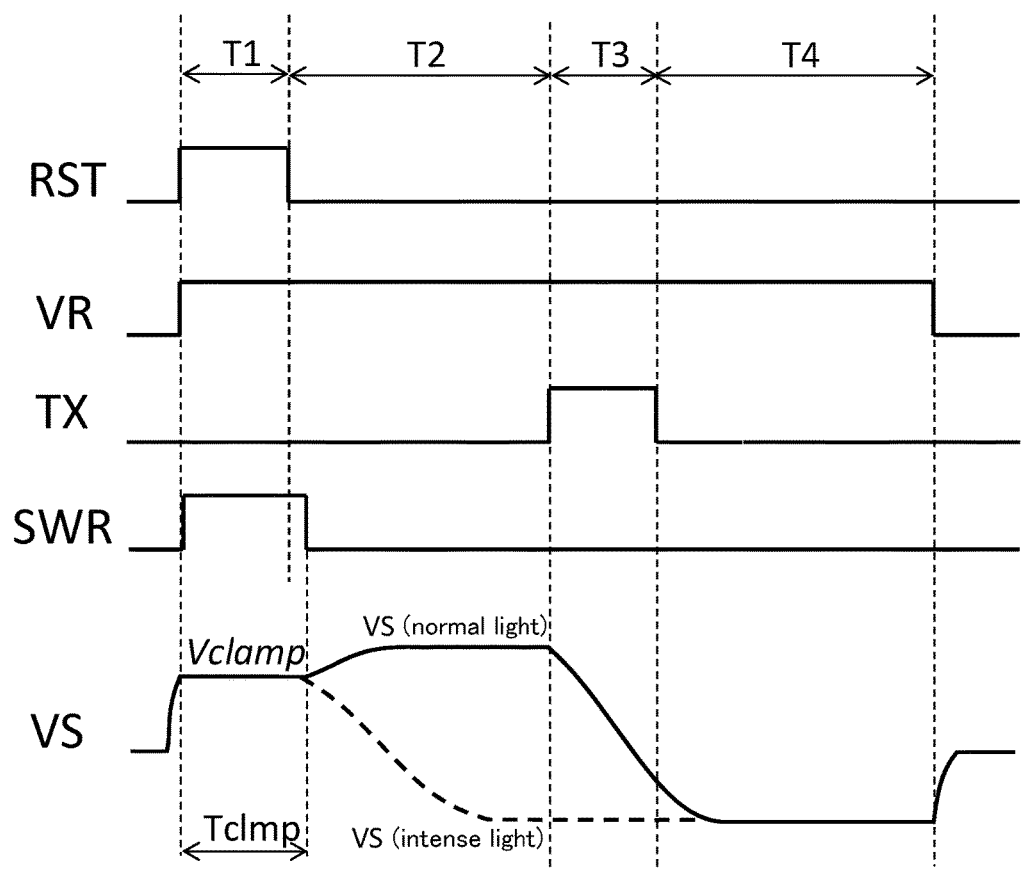
FIG. 3 is a timing chart showing changes in output voltages on each signal line during a period from the reception of light until the reading of charge in the solid-state imaging device according to the one embodiment of the present invention.

A series of operations of the device 1 of the present invention, starting from the reception of light by the pixel circuit 100 to the reading of charge accumulated in the FD portion 103, will be described below with reference to FIGS. 3 and 13. FIG. 3 is a waveform diagram (timing chart) showing changes in the voltage waveforms of voltages on three types of signal lines (the RST wiring line 112a, the TX wiring line 112b, and the VR wiring line 112c) which are outputted from the row scanning circuit 110 shown in FIG. 1, a voltage on the voltage supply control line SWR that controls the switch 115, and a voltage VS on the column signal line 111. The device 1 of the present invention samples a voltage of the FD portion 103 using a correlated double sampling method and converts the voltage into a digital value corresponding to light received by the pixel circuit 100.

<<1. Operations Performed when an Intense Light Judgment is not Made>>

First, for a comparison with the present invention, a conventional reading method used when a judgment as to whether light is intense light is not made will be described with reference to FIG. 13. FIG. 13 shows a drive method for the conventional solid-state imaging device 4, but also corresponds to a waveform diagram (timing chart) showing changes in the voltage waveforms of voltages on three types of signal lines (the RST wiring line 112a, the TX wiring line 112b, and the VR wiring line 112c) which are outputted from the row scanning circuit 110 and a voltage VS on the column signal line 111 if the device 1 of the present invention does not make a judgment of intense light.

In the case of the conventional method where a judgment as to whether light is intense light is not made, first, prior to a period T1 shown in FIG. 13, there is an operating period in which electrons photoelectrically converted by the PD portion 101 are transferred to the FD portion 103 and the PD portion 101 is reset (corresponding to a period T3 which will be described later and called a shutter period). During an arbitrary period after a lapse of the shutter period, the PD portion 101 performs photoelectric conversion and thereby accumulates and holds the converted charge therein. This period is referred to as an exposure period. The PD portion 101 holds the charge accumulated by the photoelectric conversion during the exposure period, until the beginning of the period T1.

Thereafter, during the period T1, the potential of the RST wiring line 112a is brought up to a high level to place the reset transistor 105 in an on state. At this time, by setting the voltage on the VR wiring line 112c to a specified voltage, the potential of the FD portion 103 is reset to the specified FD reset voltage which is supplied through the VR wiring line 112c.

At this time, a voltage in which the voltage of the FD portion 103 is reflected is outputted as a voltage VS to the column signal line 111 through the source follower transistor 104. The voltage VS is determined by the drain voltage VD of the source follower transistor 104 which is supplied through the common power line 113, the threshold voltage of the source follower transistor 104, the amount of current flowing through the constant current source 120, and the FD reset voltage of the FD portion 103.

Thereafter, during a period T2, the potential of the RST wiring line 112a is brought down to a low level to place the reset transistor 105 in an off state. The voltage of the FD portion 103 and the voltage VS on the column signal line 111 change due to coupling capacitance between the RST wiring line 112a and the FD portion 103 and voltage feedthrough caused by overlap capacitance occurring between the RST wiring line 112a and the reset transistor 105 in accordance with the transistor size. With settling time, the voltage VS on the column signal line 111 is stabilized at a reset level voltage Vrst. The reset level voltage Vrst serves as a signal indicating the state of the FD portion 103 which is before reading electrons in the PD portion 101, and is sampled to perform AD conversion here.

At this time, the ramp wave generator 140 generates a ramp-wave reference voltage, and the comparator 131 in the AD converter 130 compares the voltage VS on the column signal line 111 which is at the reset level Vrst with the reference voltage. By the counter circuit 135 performing counting only during a period in which the reference voltage is lower than or equal to VS, the voltage VS on the column signal line 111 is converted into a digital value as a count value corresponding to the reset level voltage Vrst. The above-described period in which sampling of the reset level voltage Vrst is performed by a comparison with the ramp wave is called a reset level sampling period.

Thereafter, during the period T3, the voltage on the TX wiring line 112b is brought up to a high level to place the transfer gate transistor 102 in an on state. When charge (electrons) accumulated in the PD portion 101 is thereby transferred to the FD portion 103, the voltage of the FD portion 103 decreases, and accordingly, the voltage VS on the column signal line 111 also decreases. The voltage on the TX wiring line is brought down to a low level at the end of the period T3 to place the transfer gate transistor 102 in an off state.

Thereafter, during a period T4, due to the charge having been completely transferred to the FD portion 103, the voltage of the FD portion 103 is determined depending on the amount of light received by the PD portion 101, and accordingly, with settling time the voltage VS on the column signal line 111 is stabilized at a signal level voltage Vsig. At this time, the ramp wave generator 140 generates a ramp-wave reference voltage, and the comparator 131 in the AD converter 130 compares the voltage VS on the column signal line 111 which is at the signal level Vsig with the reference voltage. By the counter circuit 135 performing counting only during a period in which the reference voltage is lower than or equal to VS, the voltage VS on the column signal line 111 is converted into a digital value as a count value corresponding to the signal level voltage Vsig. The above-described period in which sampling of the signal level voltage Vsig is performed by a comparison with the ramp wave is called a signal level sampling period.

Then, the difference between the previously sampled reset level voltage Vrst and the signal level voltage Vsig is taken, and a digital value corresponding to the voltage difference Vele=Vrst−Vsig is written to the memory portion 133.

Figure 13:
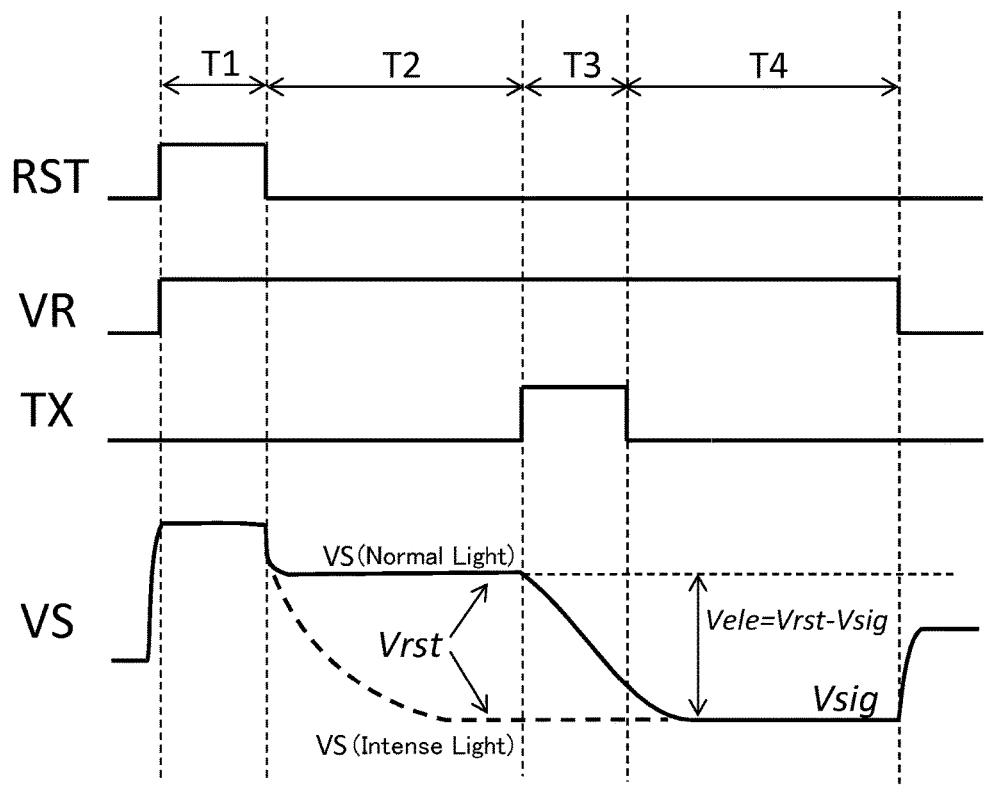
FIG. 13 is a timing chart showing changes in output voltages on each signal line during a period from the reception of light until the reading of charge in the conventional solid-state imaging device.

In this method, however, when intense light is received, the voltage VS on the column signal line 111 significantly decreases after a lapse of the period T2, and thus, as indicated by a dashed line in FIG. 13, at the worst the reset level voltage Vrst decreases to a level lower than or equal to the signal level voltage Vsig. In this case, the voltage difference Vele=Vrst−Vsig corresponding to the amount of light becomes substantially 0, causing a problem that it is erroneously judged that it is in a dark state.

In view of this, in the present invention, operations shown below are performed during a period from T1 to T2 to judge whether light received by the PD portion 101 is intense light.

<<2. Intense Light Judgment Operation of the Present Invention>>

First, as shown in FIG. 3, a voltage on the voltage supply control line SWR is brought up simultaneously with or a bit later than the beginning of a period T1 to turn on the switches 115. By this, a reference voltage generated by the reference voltage generating circuit 116 is supplied to all of the column signal lines 111. By this, the voltage VS on the column signal line 111 is fixed (clamped) at a predetermined voltage Vclamp corresponding to the reference voltage. This period is represented as a period Tclmp in FIG. 3. Here, it is preferred to set the reference voltage generated by the reference voltage generating circuit 116 such that the voltage Vclamp is lower than a reset level voltage Vrst obtained when the pixel circuit 100 receives normal light.

As described above, the reset level voltage Vrst obtained when normal light is received is determined by the amount of current flowing through the constant current source 120, the voltage VD supplied to the common power line 113, the threshold voltage of the source follower transistor 104, the voltage (FD reset voltage) of the FD portion 103, coupling capacitance between the RST wiring line 112a and the FD portion 103, and voltage feedthrough caused by overlap capacitance occurring between the RST wiring line 112a and the reset transistor 105 in accordance with the transistor size. The current setting and the voltage setting can be changed to specified voltages by an external source and the coupling capacitance and the transistor size can also be set to specified values upon designing. Thus, the reference voltage generated by the reference voltage generating circuit 116 can be set such that the voltage Vclamp is lower than the reset level voltage Vrst in all of the column signal lines 111. Taking into account process variations, etc., the current setting and the voltage setting are performed so as to cover such variations.

The period Tclmp ends simultaneously with or a bit later than the end of the period T1. When the voltage on the voltage supply control line SWR is brought down to turn off the switch 115, in a state in which the pixel circuit 100 receives normal light, the voltage VS on the column signal line 111 tries to be stabilized at the reset level voltage Vrst and thus starts to increase, and with a settling period the voltage VS is stabilized at the reset level voltage Vrst.

On the other hand, in a state in which the pixel circuit 100 receives intense light, due to, for example, charge (electrons) generated in the PD portion 101 flowing into the FD portion 103, the voltage VS on the column signal line 111 starts to decrease. The magnitude (absolute value) of a slope of the decrease is determined by the intensity of the intense light and the amount of electrons flowing into the FD portion 103. The stronger the intense light, the steeper the slope.

Therefore, by detecting the slope of the voltage change, it can be judged whether the light received by the pixel circuit 100 is intense light or normal light.

Note that in the following description the "slope" of a voltage change has polarities, and a positive slope indicates that a voltage change obtained after a lapse of a predetermined period of time is positive (increase) and a negative slope indicates that a voltage change obtained after a lapse of the predetermined period of time is negative (decrease). Note also that the magnitude of the slope of a voltage change is determined taking into account the polarities. That is, when the slope is negative, the steeper the voltage change, the smaller the slope (the larger the absolute value).

Figure 4:
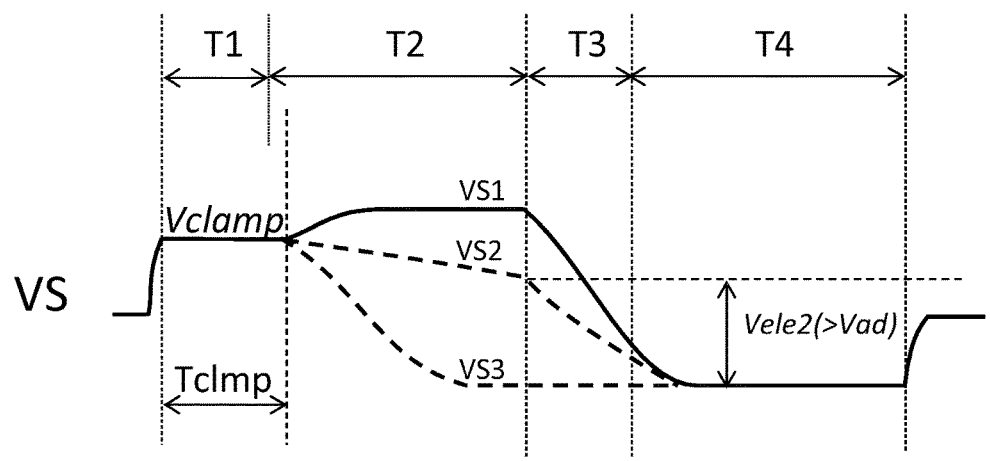
FIG. 4 is a diagram showing changes in the output voltage waveform of a column signal line during a period from the reception of light until the reading of charge in the solid-state imaging device according to the one embodiment of the present invention.

As with FIG. 3, FIG. 4 is a waveform diagram showing changes in the voltage waveform of the voltage VS on the column signal line 111, and particularly shows changes in the voltage VS on the column signal line 111 for when the pixel circuit 100 receives three types of light of different amounts.

Of voltage waveforms VS1 to VS3 of the column signal line 111 shown in FIG. 4, VS1 indicates the case of normal light and the digital code value is the full code (white).

VS3 indicates the case of intense light. The voltage on the column signal line 111 decreases to the signal level voltage Vsig during the reset level sampling period, and the digital value is originally supposed to be the full code (white), but is black.

VS2 indicates the case in which the amount of light is larger than that for VS1 and smaller than that for VS3. Although the voltage on the column signal line 111 drops, since the difference Vele2 between the reset level voltage Vrst during the reset level sampling period and the signal level voltage Vsig is larger than a voltage Vad corresponding to the full scale of the AD converter 130, the digital value is the full code.

Meanwhile, when light whose amount is between VS2 and VS3 but exceeds a predetermined threshold value is received, the digital value is supposed to be the full code, but is an intermediate code (=gray) or black.

In the device 1 of the present invention, during a period after the reset period and before the reset level sampling period begins, a voltage change of the column signal line 111 obtained after the reset is detected to judge, based on a slope of the voltage change, whether received light is intense light or normal light, and a result of the judgment is reflected in a digital value. That is, the device 1 of the present invention judges, from the slope of the voltage change, whether the amount of light exceeds the above-described threshold value. If it is judged that the light is intense light, the device 1 of the present invention outputs a predetermined, intended, default value (here, the full code) as a digital code value corresponding to the amount of light received by the pixel circuit 100, regardless of the actual reset level voltage Vrst, and stores the digital code value in the memory portion 133.

Figure 5:
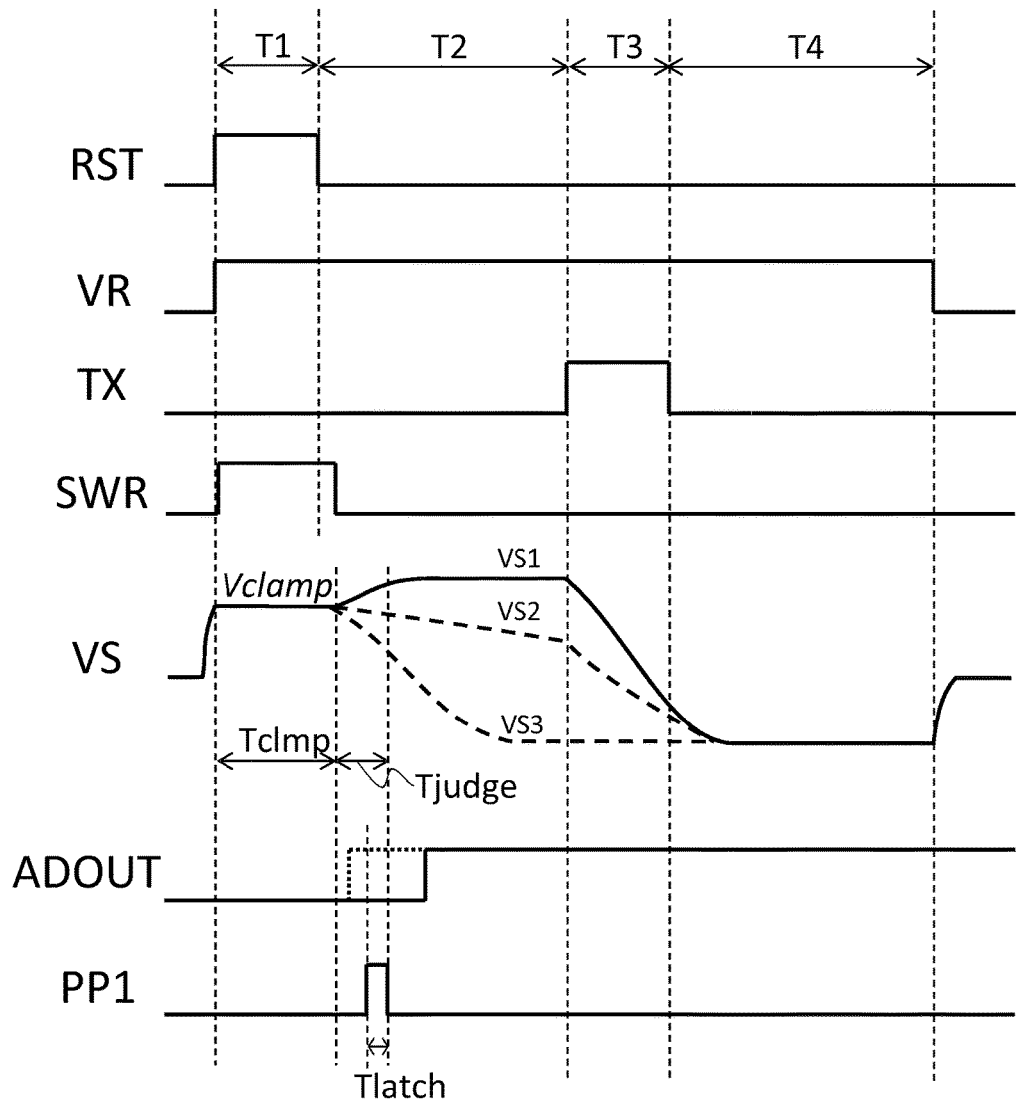
FIG. 5 is an output voltage waveform diagram of each signal line for illustrating an intense light judgment method in the solid-state imaging device according to the one embodiment of the present invention.

FIG. 5 shows a detail of an intense light judgment method of the device 1 of the present invention. As shown in FIG. 5, when a period Tclmp ends during a period T2, the voltage VS on the column signal line 111 starts to increase or decrease in accordance with the amount of light received by the PD portion 101 in the pixel circuit 100. During a period Tjudge which starts after the end of the period Tclmp, a voltage change of the voltage VS on the column signal line 111 is detected and a slope of the voltage change is measured.

During the period Tjudge, the column signal line 111 is connected to a comparator. As the comparator, the comparator 131 in the AD converter 130 which is used to sample the reset level voltage Vrst is used, achieving a reduction in layout area.

First, at the beginning of the period Tjudge or in the middle of the Tclmp period, a predetermined comparison voltage (e.g., the same voltage as Vclamp or a voltage slightly lower than Vclamp is preferred) is applied to one of a pair of input terminals of the comparator 131 that is not connected to the column signal line 111, to adjust the reference of the comparator 131. At this time, the output of the comparator 131 is configured to output a low-level signal. For example, by placing the comparator 131 in an auto-zero state, the same voltage as Vclamp can be set at the one of the pair of input terminals.

Then, during the period Tjudge, the voltage VS on the column signal line 111 is inputted to the other one of the pair of input terminals of the comparator 131, by which a voltage that is amplified in accordance with the slope of the voltage change of the voltage VS on the column signal line 111 due to the amplification action of the comparator 131 is outputted from the comparator 131. ADOUT shown in FIG. 5 is that signal and is reversely amplified.

Figure 6:
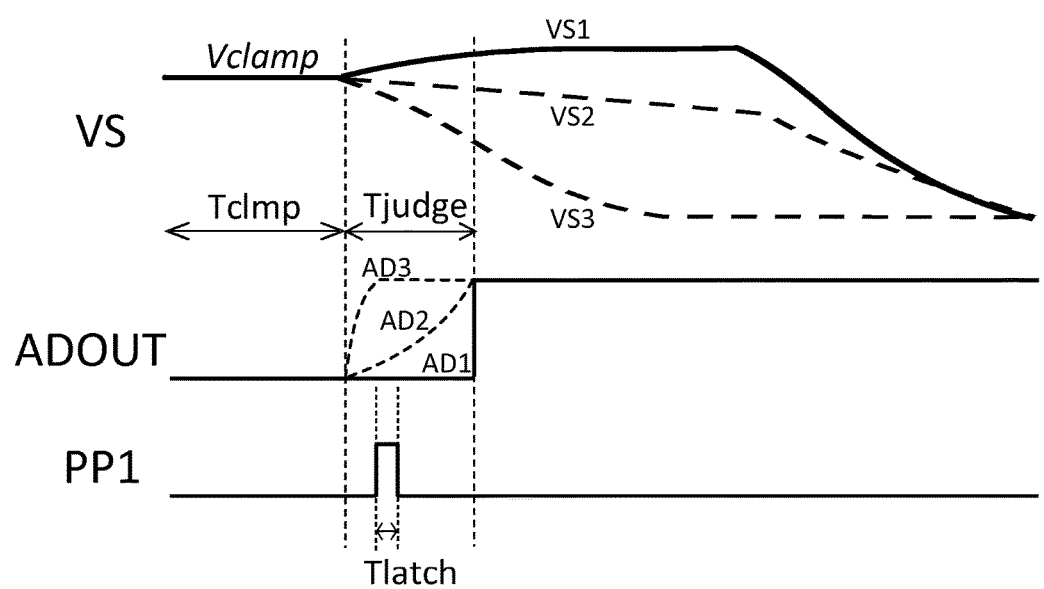
FIG. 6 is an output voltage waveform diagram of each signal line for illustrating an intense light judgment method in the solid-state imaging device according to the one embodiment of the present invention.

FIG. 6 is an enlarged view of the voltage waveforms of the ADOUT output and the voltage VS on the column signal line 111 during the period Tjudge in FIG. 5. In the voltage waveforms VS1 to VS3 of the column signal line 111, the voltage waveform of the output ADOUT from the comparator 131 for the voltage waveform VS1 is AD1, the voltage waveform of the output ADOUT from the comparator 131 for the voltage waveform VS2 is AD2, and the voltage waveform of the output ADOUT from the comparator 131 for the voltage waveform VS3 is AD3.

VS1 indicates the case in which the light received by the pixel circuit 100 is normal light, and the voltage on the column signal line 111 increases with a positive slope. At this time, the output AD1 from the comparator 131 is reversely amplified and thus is maintained at the low level with no change even after the period Tjudge begins.

VS3 indicates the case in which the light received by the pixel circuit 100 is intense light, and the voltage on the column signal line 111 decreases with a negative slope with a large absolute value. Accordingly, the output AD3 from the comparator 131 is amplified after the period Tjudge begins and transitions to a high level with a steep slope.

VS2 indicates the case in which the amount of light received by the pixel circuit 100 is larger than that for VS1 and smaller than that for VS3, and the voltage on the column signal line 111 decreases with a gradual negative slope with a small absolute value. Accordingly, the output AD2 from the comparator 131 is amplified, but slowly transitions to a high level after the period Tjudge begins.

The output ADOUT (AD1 to AD3) from the comparator 131 is inputted to the judging circuit 132. The judging circuit 132 has two input terminals, i.e., an input terminal to which the output ADOUT is inputted and an input terminal that accepts as input a positive or negative pulse signal from the intense light judgment signal line PP1. When a pulse signal is inputted to the judging circuit 132 from the intense light judgment signal line PP1, the judging circuit 132 judges whether the received light is intense light, based on the voltage level of the output ADOUT from the comparator 131. Therefore, the reference value of the slope that judges the light to be intense light is adjusted by the timing at which the pulse signal is inputted and the comparison voltage of the comparator 131 during the period Tjudge. When the slope of the voltage change of the column signal line 111 is greater than or equal to the reference value, the judging circuit 132 judges that the light received by the pixel circuit 100 is normal light. When the slope of the voltage change of the column signal line 111 is smaller than the reference value, the judging circuit 132 judges that the light received by the pixel circuit 100 is intense light.

Figure 7:
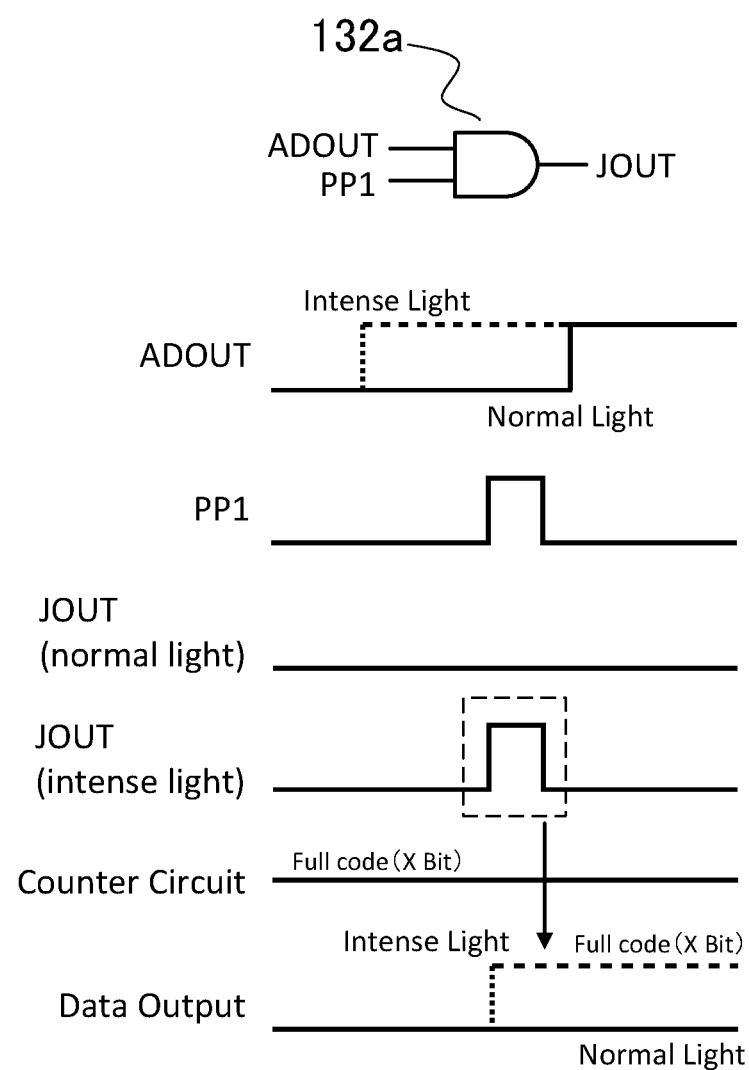
FIG. 7 is a circuit diagram showing a configuration example of a judging circuit used for a determination of intense light, and a timing chart showing operations performed by the judging circuit upon an intense light judgment.

FIG. 7 is a configuration example of the judging circuit 132. The judging circuit 132 can be configured by a logic circuit (AND circuit) 132a that accepts as input an output ADOUT from the comparator 131 and a positive pulse signal from the intense light judgment signal line PP1.

When normal light where the voltage waveform of the column signal line 111 is VS1 is received, since the output AD1 from the comparator 131 is maintained at the low level, an output JOUT from the AND circuit 132a is always at a low level, regardless of the pulse signal from the intense light judgment signal line PP1. In this case, a digital code value is determined by the voltage difference between a reset level Vrst and a signal level Vsig which are sampled subsequently, and is recorded in the memory portion 133.

On the other hand, when intense light where the voltage waveform of the column signal line 111 is VS3 is received, when, as shown in FIG. 6, the position of the pulse signal from the intense light judgment signal line PP1 is set to Tlatch, since the output AD3 from the comparator 131 has transitioned to a high level at the time point when the pulse signal is inputted, the output JOUT from the AND circuit 132a outputs a high-level pulse signal during a period in which the positive pulse signal from the intense light judgment signal line PP1 is outputted. The memory portion 133 latches, during the period Tlatch, the pulse signal JOUT which is an output from the AND circuit 132a and stores the full code (the maximum value or minimum value represented by the same number of bits as a digital value outputted from the AD converter 130). By holding this storage at the time of reset level sampling and at the time of signal sampling, too, in the case of intense light the digital code value can be substituted for the full code.

At this time, the configuration is preferably such that during the period Tjudge, the counter circuit 135 outputs a count value corresponding to the full code, and when a pulse signal JOUT is outputted, the count value of the counter circuit 135 is written to the memory portion 133.

On the other hand, when intense light where the voltage waveform of the column signal line 111 is VS2 is received, since the output AD2 from the comparator 131 has not yet reached a high level at the time point when a pulse signal from the intense light judgment signal line PP1 is inputted, the output JOUT from the AND circuit 132a is maintained at the low level. Therefore, the light is not judged to be intense light, and a digital code value is determined by the voltage difference between a reset level Vrst and a signal level Vsig which are sampled subsequently, and is recorded in the memory portion 133.

By thus adjusting the period Tlatch in which a pulse signal from the intense light judgment signal line PP1 is inputted, even if the voltage change of the column signal line 111 has a negative slope, it can be judged that the light is not intense light when the slope is large (the absolute value is small).

Referring back to FIG. 5, when the judgment as to whether the light is intense light is completed during the period Tjudge, during the reset sampling period within the period T2, the comparator 131 in the AD converter 130 is placed in an auto-zero state, and a reference voltage from the ramp wave generator 140 is applied to one terminal of the comparator 131 to start a count operation of the counter circuit 135, and a transition to sampling of a reset level voltage Vrst is made. Thereafter, during a period T3, the transfer gate transistor 102 is placed in an on state to transfer electrons accumulated in the PD portion 101 to the FD portion 103. During a period T4, a signal level voltage Vsig is sampled likewise. Operations performed during and after the reset sampling period are the same as those for the above-described case in which a judgment as to whether the light is intense light is not made.

Figure 8:
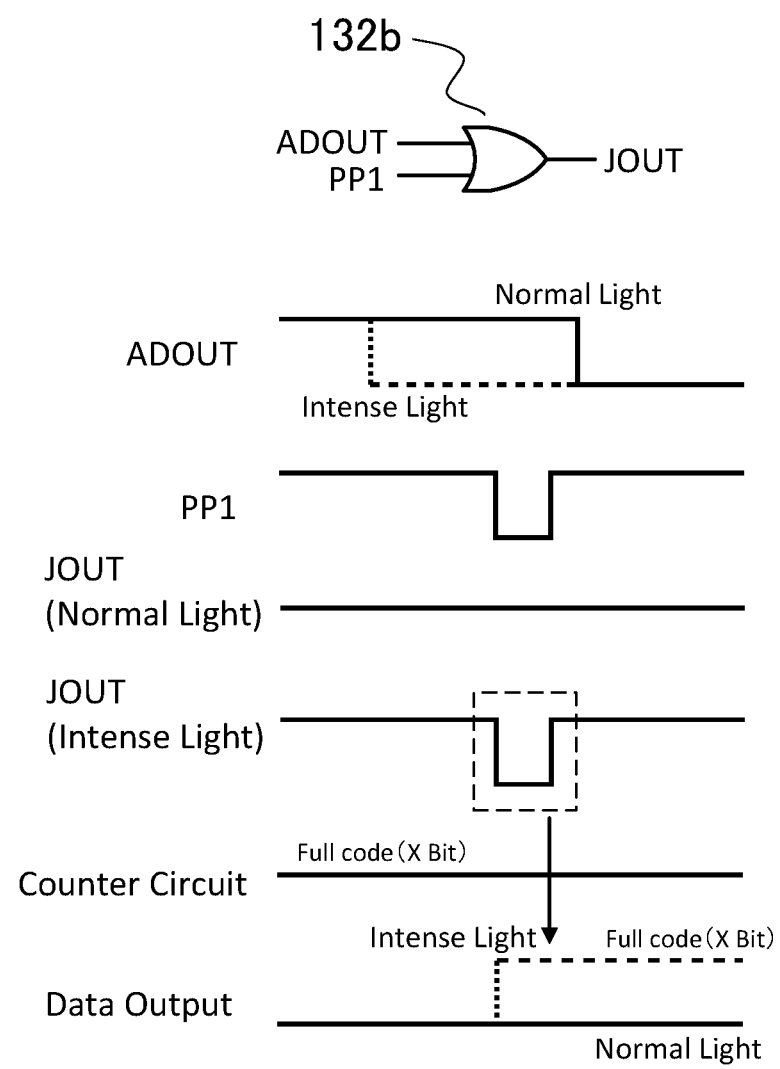
FIG. 8 is a circuit diagram showing a configuration example of a judging circuit used for a determination of intense light, and a timing chart showing operations performed by the judging circuit upon an intense light judgment.

Note that the above-described configuration of the judging circuit 132 is an example of the case in which the output ADOUT from the comparator 131 is set to a low level in the case of normal light, but the case is also considered in which the output ADOUT from the comparator 131 is set to a high level in the case of normal light. In that case, it is preferred that, as shown in FIG. 8, the judging circuit 132 is configured by an OR circuit 132b that accepts as input an output ADOUT from the comparator 131 and a negative pulse signal from the intense light judgment signal line PP1.

In addition, it is preferred that, the reference value of the slope is set, and the position of the period Tlatch within the period Tjudge and the comparison voltage of the comparator 131 is adjusted, such that the voltage difference between the actual reset level and signal level (Vrst−Vsig) is larger than the full-scale voltage Vad of the AD converter 130, when the reference value of the slope of the voltage change of the column signal line 111 which is judged to be intense light is negative and light where the slope of the voltage change of the column signal line 111 matches the reference value is received.

By setting the reference value of the slope to be negative, the light can be judged to be normal light when the slope of the voltage change of the column signal line 111 is positive. Furthermore, by approximating the reference value of the slope to a negative value as large (small in the absolute value) as possible, i.e., zero, a judgment as to whether the light is intense light is facilitated. However, if the reference value of the slope gets too close to negative zero, despite the fact that the light is normal light, it is erroneously judged that the light is intense light due to variations in the characteristics of the pixel circuits 100, increasing the risk of generating white dots in a normal image. Hence, it is preferred that the upper limit (the lower limit of the absolute value) of the reference value of the slope is set to a negative value taking into account the variations in the characteristics of the pixel circuits 100. By this, the positive slope side by which the light is judged to be normal light can have a margin.

On the other hand, when light where the slope of the voltage change of the column signal line 111 has the exact reference value is received, if the voltage difference between the reset level and the signal level (Vrst−Vsig) is larger than the full-scale voltage Vad, then even if normal light is erroneously judged to be intense light (or intense light is erroneously judged to be normal light) due to the variations in the characteristics of the pixel circuits 100, the full code is outputted as a result and thus a problem does not occur. That is, it is preferred that the lower limit of the reference value of the slope is set, such that the reference value of the slope is larger (the absolute value of the slope is smaller) by an amount considering the variations in the characteristics of the pixel circuits 100 than the slope of a voltage change for when the voltage difference (Vrst−Vsig) matches the exact full-scale voltage Vad.

As described above, according to the device 1 of the present invention, the comparator 131 in the AD converter 130 is used for a comparison of the voltage VS on the column signal line 111, the judging circuit 132 can be implemented using a logic circuit with a small occupation area, and the device 1 of the present invention can be implemented using a layout added with the judging circuits 132 and the switches 115 and wiring lines associated therewith. Thus, the device 1 of the present invention can judge whether light received by the pixel circuits 100 is intense light, while significantly suppressing the layout areas for each column.

In addition, since the intense light judgment is made at different time from a sampling period for a reset level voltage Vrst, the intense light judgment can be made without degrading dark characteristics. In addition, since the judgment is made independently of AD conversion, the judgment is not influenced by AD conversion conditions for the case of high gain, etc. In addition, no matter how strong intense light gets, since the negative slope gets smaller (the absolute value gets larger), the light can be judged to be intense light.

Second Embodiment

Figure 9:
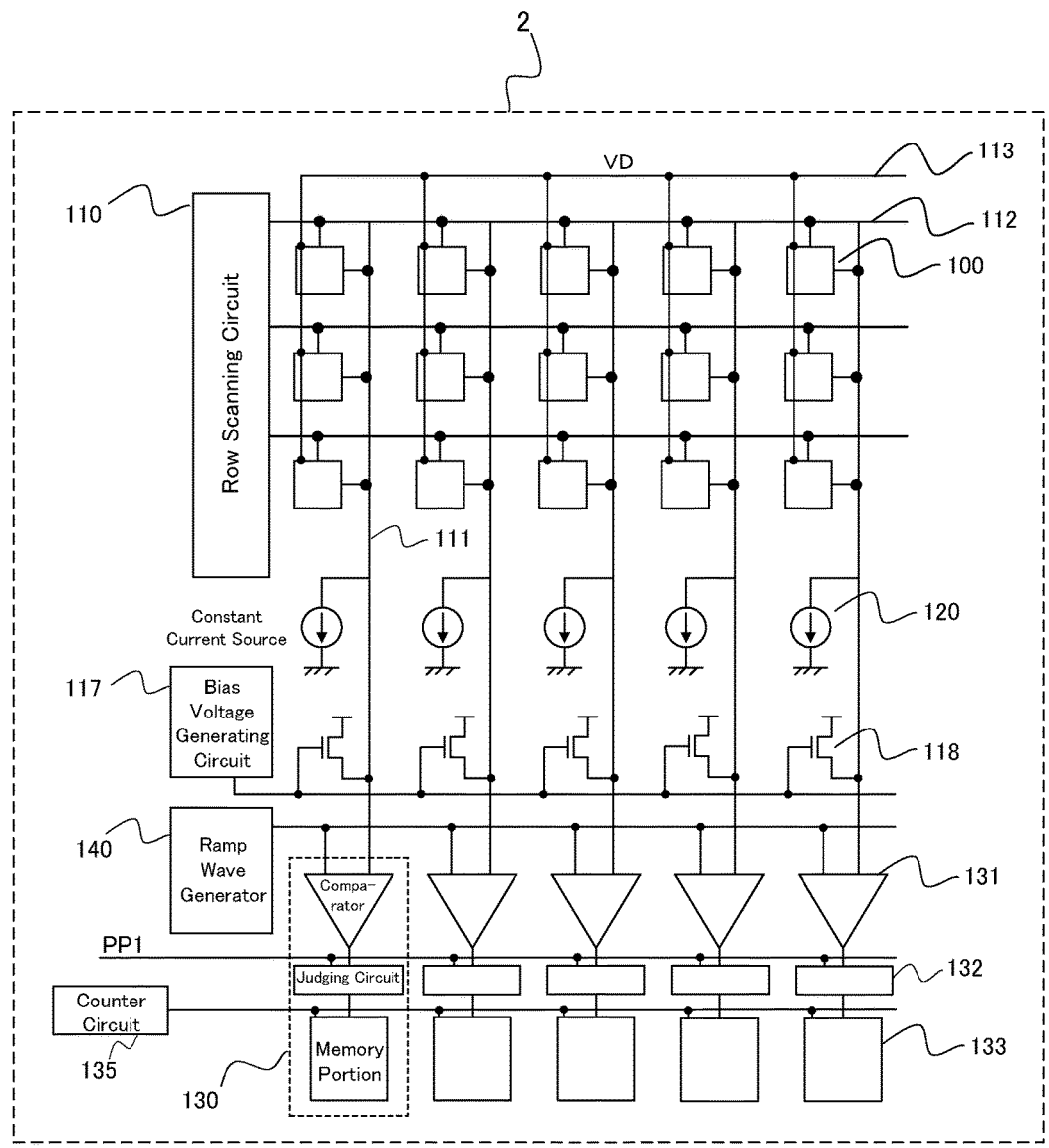
FIG. 9 is a circuit configuration diagram showing an example of a solid-state imaging device according to another embodiment of the present invention.

In the following, a solid-state imaging device according to one embodiment of the present invention (hereinafter, referred to as the "device 2 of the present invention", as appropriate) will be described with reference to the drawings. FIG. 9 shows an example of a circuit configuration of the device 2 of the present invention. The device 2 of the present invention has a bias voltage generating circuit 117 instead of a reference voltage generating circuit 116 in the device 1 of the present invention shown in FIG. 1, and has clamp voltage generating transistors 118 for each column.

The clamp voltage generating transistors 118 are provided for each column. Each clamp voltage generating transistor 118 is connected at its gate terminal to the bias voltage generating circuit 117 and connected at its drain terminal to a reference voltage and connected at its source terminal to a corresponding column signal line 111. Thus, the clamp voltage generating transistor composes a source follower circuit. The clamp voltage generating transistor 118 has a switching function of fixing a voltage VS on the column signal line 111 at a clamp voltage. By applying a predetermined control voltage to the gate terminal of the clamp voltage generating transistor 118 through the bias voltage generating circuit 117 during the aforementioned period Tclmp, the voltage VS on the column signal line 111 is fixed at a desired clamp voltage Vclamp. An intense light judgment method of the device 2 of the present invention is the same as that of the device 1 of the present invention except for a clamp voltage generation method and thus a detailed description thereof is omitted.

The above-described device 1 of the present invention generates a reference voltage using the reference voltage generating circuit 116 which is common for each column, and supplies a clamp voltage through switches 115. Hence, when the period Tclmp is short, a voltage difference may occur between a portion close and a portion far in distance from the reference voltage generating circuit 116 due to the resistances of wiring lines to which the reference voltage is supplied, and accordingly, the clamp voltage may vary between the column signal lines 111.

In the device 2 of the present invention, however, since a control voltage is generated for each column, even when the period Tclamp is short, it is possible to prevent a voltage difference caused by wiring line resistances from occurring in the clamp voltage. On the other hand, since the clamp voltage generating transistor 118 composes a source follower circuit, variations in threshold voltage need to be considered.

Furthermore, a clamp voltage which is supplied to the column signal line 111 can be adjusted in accordance with a control voltage applied to the gate terminal of the clamp voltage generating transistor 118.

Figure 10:
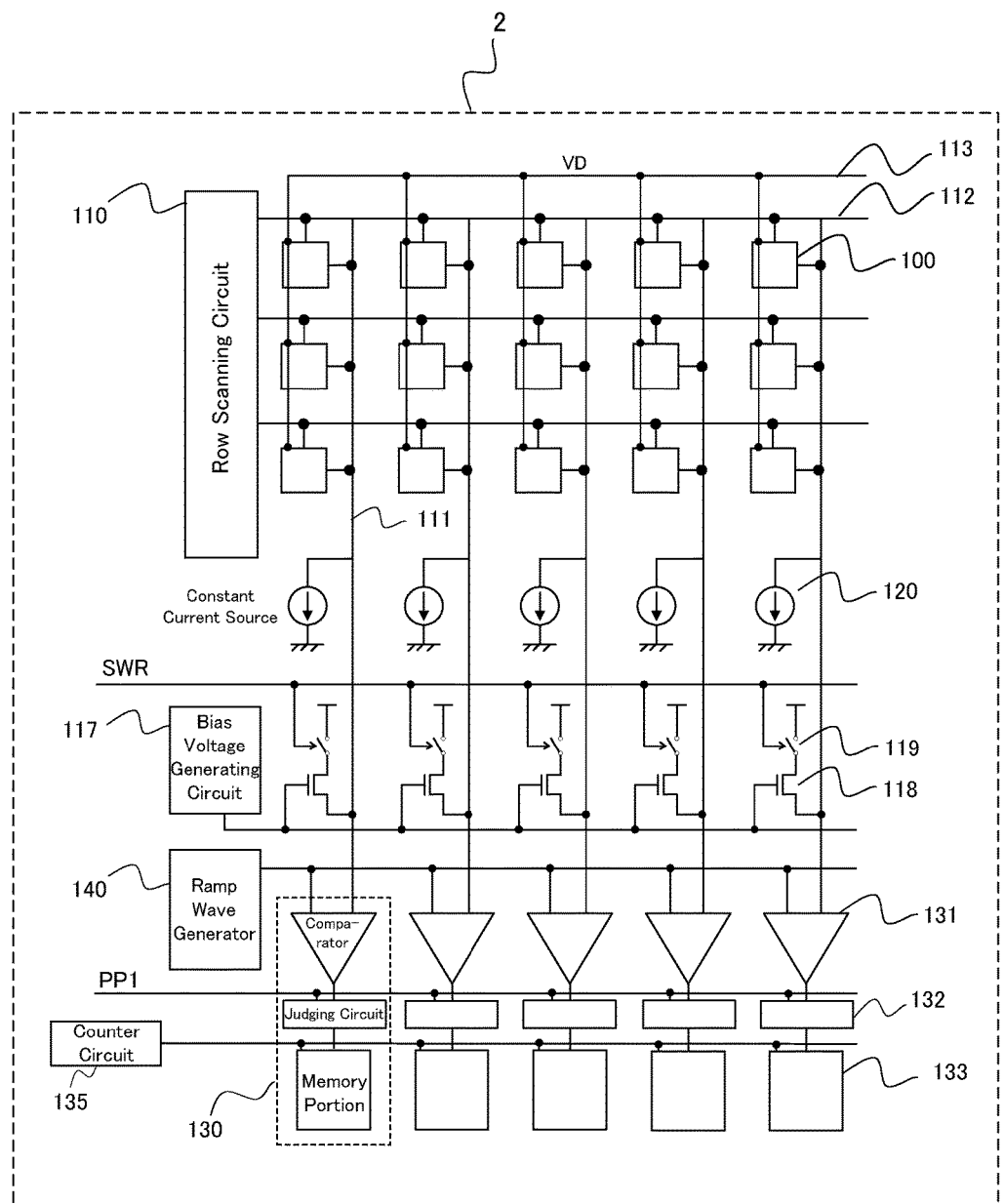
FIG. 10 is a circuit configuration diagram showing an example of a solid-state imaging device according to still another embodiment of the present invention.

FIG. 10 shows a variation of the device 2 of the present invention which is configured such that control of supply of a clamp voltage to the column signal lines 111 is performed through switches 119 which are provided for each column. The switches 119 are controlled by a voltage control line SWR. As shown in FIG. 3, by setting this signal to a high level only during the period Tclmp, a reference voltage is supplied to the drain terminals of the clamp voltage generating transistors 118 and thus the voltages on the column signal lines 111 are clamped. By this, the bias voltage generating circuit 117 only needs to function as a voltage source that always generates a fixed control voltage, enabling to simplify the circuit configuration.

Third Embodiment

The above-described first and second embodiments describe a method in which a voltage on a column signal line 111 is clamped during a period Tclmp and it is judged whether light received by the pixel circuit 100 is intense light, based on a slope of a voltage change of the column signal line 111 after a lapse of the period Tclmp. However, it is also possible to employ a method in which an intense light judgment is made without clamping the voltage on the column signal line 111.

Figure 11:
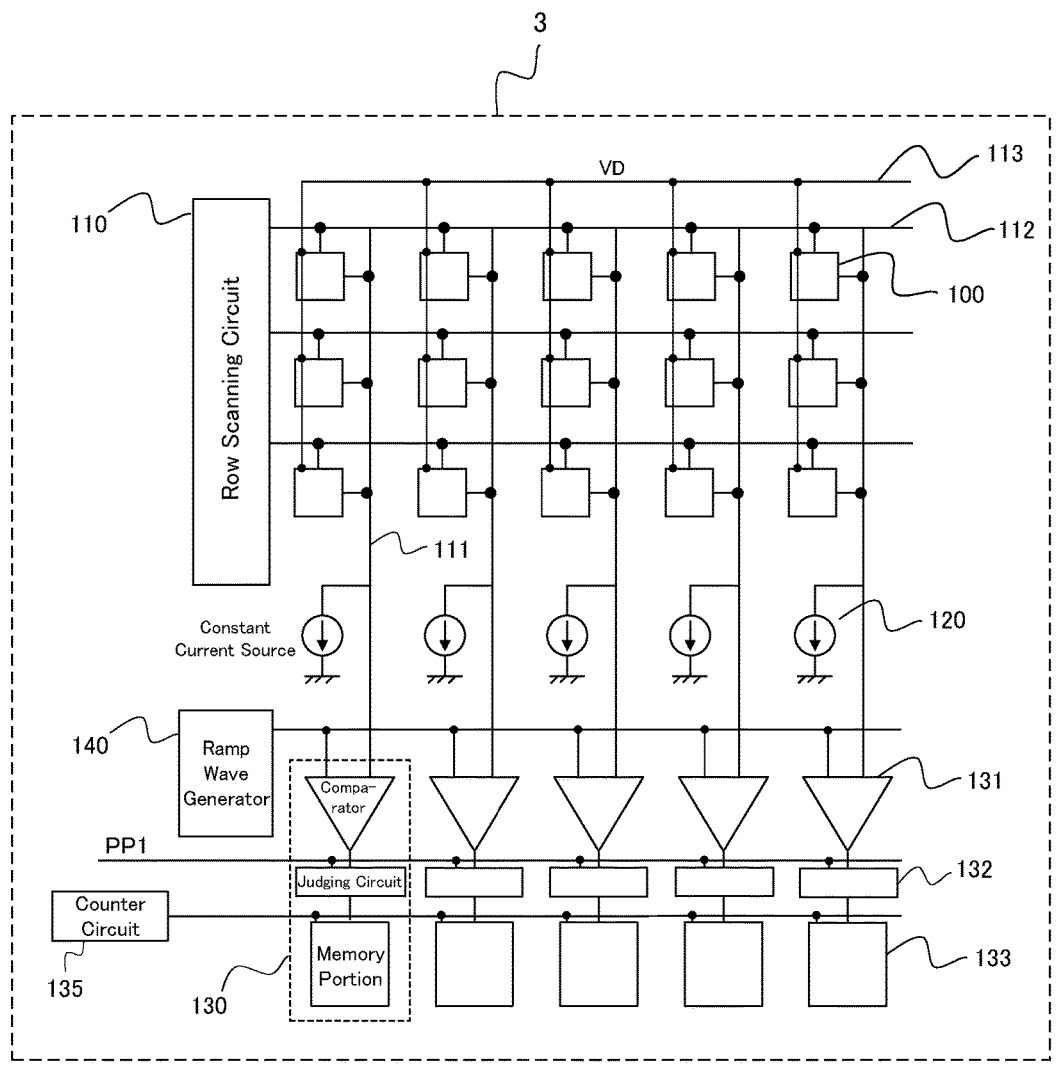
FIG. 11 is a circuit configuration diagram showing an example of a solid-state imaging device according to yet another embodiment of the present invention.
Figure 12:
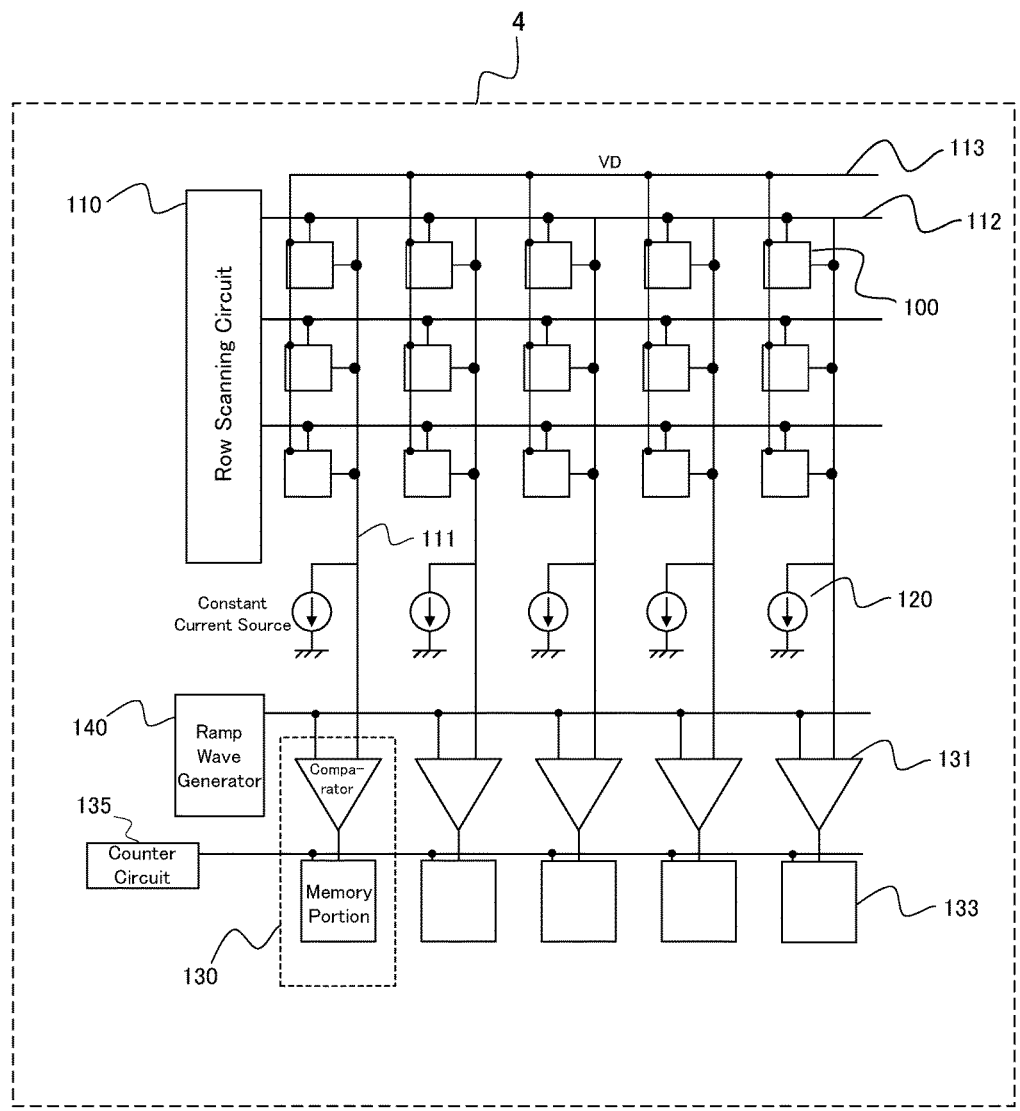
FIG. 12 is a circuit configuration diagram showing a configuration of a conventional solid-state imaging device (CMOS image sensor).

FIG. 11 shows a configuration example of a solid-state imaging device according to one embodiment of the present invention (hereinafter, referred to as the "device 3 of the present invention", as appropriate). The device 3 of the present invention is the same as the devices 1 and 2 of the present invention except that the device 3 of the present invention does not have a circuit for clamping column signal line voltages (the reference voltage generating circuit 116 or the bias voltage generating circuit 117 and wiring lines, switches, etc., connected thereto).

An intense light judgment operation of the device 3 of the present invention is the same as the judgment operations of the devices 1 and 2 of the present invention except that voltages VS on column signal lines 111 are not clamped. A comparator 131 in an AD converter 130 amplifies a voltage change of a column signal line 111 obtained after a lapse of a reset period T1, and a slope of the voltage change of the column signal line 111 is detected, by which a judgment as to whether light received by a pixel circuit 100 is intense light can be made. In the present invention, normal light and intense light are detected based on the slope of the voltage change of the column signal line 111. Thus, without the need to fix a voltage VS on the column signal line 111 at a clamp voltage, if there is a point where the slope of the voltage change can be accurately detected, then a judgment of normal light and intense light can be made. Note, however, that in the case of the device 3 of the present invention, even if light is normal light, the slope of the voltage change obtained after a lapse of the reset period is generally negative, and thus, the reference value of the slope by which light is judged to be intense light needs to be set to be smaller (the absolute value is larger) than the slope for the case of normal light.

By this, the device 3 of the present invention can omit all of the circuits for clamping the voltages VS on the column signal lines 111, enabling to further reduce the layout areas.

Note that the above-described first to third embodiments describe, as an example, the case of digital CDS where each of a reset level voltage Vrst and a signal level voltage Vsig is AD-converted and the difference between the digital values is obtained. However, even in the case of analog CDS where the difference between a reset level voltage and a signal level voltage (Vrst−Vsig) is AD-converted into a digital code value, since the memory portions 133 hold results of judgments made by the judging circuits 132, the present invention can be applied to both of the CDS schemes.

SUMMARY

By the above, the solid-state imaging devices according to the embodiments of the present invention can be grasped as follows, for example.

A solid-state imaging device according to an embodiment of the present invention is a solid-state imaging device that has a plurality of pixel circuits 100 arranged in a matrix form in column and row directions and reads the amounts of accumulated charge using a correlated double sampling method, the plurality of pixel circuits 100 converting the amounts of accumulated charge into voltages by photoelectric conversion, and outputting the converted voltages to column signal lines 111, and that includes AD converters 130 that convert the output voltages VS outputted to the column signal lines 111 into digital values.

Each of the AD converters 130 includes: a comparator 131 that compares a corresponding one of the output voltages VS with a ramp-wave reference voltage during a sampling period in which the output voltages are sampled; a judging circuit 132 that accepts as input an output from the comparator 131 and judges a voltage level of the output voltage VS; and a memory portion 133 that stores, as the digital value, a count value corresponding to the output voltage VS, based on an output from the judging circuit 132. The comparator 131 amplifies a voltage change of the output voltage VS obtained after a lapse of a reset period in which a voltage of a floating diffusion portion 103 in a corresponding one of the pixel circuits 100 is reset, and the judging circuit 132 judges, based on the voltage change, whether light received by the pixel circuit 100 is intense light, during a predetermined detection period Tjudge between the reset period and a reset level sampling period in which the output voltage Vrst obtained after the reset is sampled.

By this, a judgment as to whether light received by a pixel circuit 100 is intense light can be made while significantly suppressing the layout areas. Furthermore, since the judgment as to whether the light is intense light is made at different time from the sampling period for the reset level voltage Vrst, the dark characteristics are not degraded. Furthermore, since the judgment is made independently of AD conversion, the judgment is not influenced by AD conversion conditions for the case of high gain, etc.

Specifically, the configuration is such that, when a slope of the voltage change is greater than or equal to a reference value, the judging circuit 132 judges that the light received by the pixel circuit 100 is normal light, and when the slope of the voltage change is smaller than the reference value, the judging circuit 132 judges that the light received by the pixel circuit 100 is intense light, and a result of the judgment is recorded in the memory portion 133. Since a judgment as to whether light is intense light can be thus made based on the slope of the voltage change, the judgment can be made by a simple method.

Furthermore, the judging circuit 132 can be configured such that the judging circuit 132 has two input terminals that accept as input the amplified output signal ADOUT from the comparator and a positive or negative pulse signal PP1, and judges whether the light is intense light by accepting as input the pulse signal during the detection period Tjudge, and records a result of the judgment in the memory portion 133. By this, the judging circuit 132 can be implemented using a simple logic circuit, enabling to reduce the layout areas.

In addition, the solid-state imaging device according to the embodiment of the present invention includes a circuit that fixes the output voltage VS at a predetermined clamp voltage Vclamp during the reset period, enabling to easily detect the slope of the change in the output voltage VS on the column signal line 111 obtained after the application of the clamp voltage. At this time, it is preferred that the clamp voltage Vclamp is a lower voltage than the reset level Vrst at which the output voltage obtained after the reset is sampled when the pixel circuit 100 receives normal light. With this configuration, if the received light is normal light, the slope of the voltage change of the column signal line 111 is positive, facilitating a judgment by the judging circuit 132 as to whether the light is intense light.

Furthermore, by setting the voltage difference between the reset level Vrst at which the output voltage obtained after the reset is sampled and a signal level Vsig at which the output voltage obtained after transferring the accumulated charge to the floating diffusion portion 103 is sampled, to be larger than a full-scale voltage Vad of the AD converter (Vrst−Vsig>Vad) when light where the slope of the voltage change has the reference value is received, normal light can be prevented from being erroneously judged to be intense light, or intense light can be prevented from being erroneously judged to be normal light.

INDUSTRIAL APPLICABILITY

The present invention can be used for solid-state imaging devices and can be particularly used to correct a blackening phenomenon occurring when intense light is received.

DESCRIPTION OF SYMBOLS 1 to 3 SOLID-STATE IMAGING DEVICE ACCORDING TO ONE EMBODIMENT OF THE PRESENT INVENTION (DEVICE OF THE PRESENT INVENTION)
4 SOLID-STATE IMAGING DEVICE OF CONVENTIONAL CONFIGURATION
100 PIXEL CIRCUIT
101 PHOTODIODE PORTION (PD PORTION)
102 TRANSFER GATE TRANSISTOR
103 FLOATING DIFFUSION PORTION (FD PORTION)
104 SOURCE FOLLOWER TRANSISTOR
105 RESET TRANSISTOR
110 ROW SCANNING CIRCUIT
111 COLUMN SIGNAL LINE
112 ROW SIGNAL LINE
112a RST WIRING LINE
112b TX WIRING LINE
112c VR WIRING LINE
113 COMMON POWER LINE
115 and 119 SWITCH
116 REFERENCE VOLTAGE GENERATING CIRCUIT
117 BIAS VOLTAGE GENERATING CIRCUIT
118 CLAMP VOLTAGE GENERATING TRANSISTOR
120 CONSTANT CURRENT SOURCE
130 AD CONVERTER
131 COMPARATOR
132 JUDGING CIRCUIT
132a and 132b LOGIC CIRCUIT
133 MEMORY PORTION
135 COUNTER CIRCUIT
140 RAMP WAVE GENERATOR
ADOUT OUTPUT VOLTAGE FROM COMPARATOR
JOUT OUTPUT SIGNAL FROM JUDGING CIRCUIT
PP1 INTENSE LIGHT JUDGMENT SIGNAL LINE
SWR VOLTAGE SUPPLY CONTROL LINE
Tclmp CLAMP PERIOD
Tjudge JUDGMENT PERIOD AS TO WHETHER LIGHT IS INTENSE LIGHT
Vad FULL-SCALE VOLTAGE OF AD CONVERTER
Vclamp CLAMP VOLTAGE
VD PIXEL COMMON VOLTAGE Vrst RESET LEVEL VOLTAGE
Vsig SIGNAL LEVEL VOLTAGE
VS and VS1 to VS3 VOLTAGE OUTPUTTED TO COLUMN SIGNAL LINE

The invention claimed is:

1. A solid-state imaging device that has a plurality of pixel circuits arranged in a matrix form in column and row directions and reads amounts of accumulated charge using a correlated double sampling method, the plurality of pixel circuits converting the amounts of accumulated charge into voltages by photoelectric conversion, and outputting the converted voltages to column signal lines, the solid-state imaging device comprising:

AD converters that convert the output voltages outputted to the column signal lines into digital values, wherein each of the AD converters includes:
a comparator that compares an output voltage which corresponds to one of the output voltages with a ramp-wave reference voltage during a sampling period in which the output voltages are sampled;
a judging circuit that accepts as input an output from the comparator and judges a voltage level of the output voltage; and
a memory portion that stores, as the digital value, a count value corresponding to the output voltage, based on an output from the judging circuit, the comparator compares the output voltage obtained after a lapse of a reset period in which a voltage of a floating diffusion portion in a pixel circuit which corresponds to one of the pixel circuits is reset, with a predetermined comparison voltage and amplifies a voltage difference between the output voltage and the comparison voltage, and the judging circuit judges whether light received by the pixel circuit is intense light, during a predetermined detection period between the reset period and a reset level sampling period in which the output voltage obtained after the reset is sampled as a reset level voltage, based on a slope of a voltage change when the output voltage changes toward the reset level voltage immediately after the reset period.

2. The solid-state imaging device according to claim 1, wherein
when the judging circuit judges that the light is the intense light, a digital code value corresponding to an amount of the light received by the pixel circuit is set to a predetermined default value regardless of an actual voltage value of the output voltage obtained after the reset, and is stored in the memory portion.

3. The solid-state imaging device according to claim 1, wherein when the slope is greater than or equal to a reference value, the judging circuit judges that the light received by the pixel circuit is normal light, and when the slope is smaller than the reference value, the judging circuit judges that the light received by the pixel circuit is intense light, and a result of the judgment is recorded in the memory portion.

4. The solid-state imaging device according to claim 3, wherein the reference value is zero or a negative value.

5. The solid-state imaging device according to claim 3, wherein, when light where the slope has the reference value is received, a voltage difference between the reset level voltage and a signal level at which the output voltage obtained after transferring the accumulated charge to the floating diffusion portion is sampled is larger than a full-scale voltage of the AD converter.

6. The solid-state imaging device according to claim 1, wherein the judging circuit has two input terminals that accept as input the amplified output signal from the comparator and one of positive and negative pulse signals, and judges whether the light is the intense light, by accepting as input the pulse signal during the detection period, and records a result of the judgment in the memory portion.

7. The solid-state imaging device according to claim 1, wherein during the detection period, the count value is always set to one of a maximum value and a minimum value represented by the same number of bits as the digital value.

8. The solid-state imaging device according to claim 1, further comprising a circuit that fixes the output voltage at a predetermined clamp voltage during the reset period.

9. The solid-state imaging device according to claim 8, wherein the clamp voltage is a lower voltage than the reset level voltage obtained when the pixel circuit receives normal light.

10. The solid-state imaging device according to claim 8, wherein
each of the column signal lines is connected to a same reference voltage through a corresponding one of switches provided for each column signal line, and
the output voltage obtained during the reset period is fixed at the clamp voltage by turning on a corresponding one of the switches during the reset period.

11. The solid-state imaging device according to claim 10, further comprising a bias voltage generating circuit that generates and supplies a same control voltage to each of the column signal lines, wherein
the clamp voltage supplied to the column signal line is adjustable by the control voltage.

* * * * *